United States Patent [19]

Comini et al.

[11] Patent Number: 5,304,546
[45] Date of Patent: Apr. 19, 1994

[54] PROCESS OF REFINING MIXTURES OBTAINED FROM TREATMENTS OF FATTY MEDIA WITH CYCLODEXTRIN AND CONTAINING COMPLEXES OF CYCLODEXTRIN WITH LIPOPHILIC COMPOUNDS

[75] Inventors: Serge Comini, La Gorgue; Léon Mentink, Estaires, both of France

[73] Assignee: Roquette Freres, France

[21] Appl. No.: 647,051

[22] Filed: Jan. 29, 1991

[30] Foreign Application Priority Data

Jan. 29, 1990 [FR] France ................... 90 01009

[51] Int. Cl.$^5$ ............... A01N 43/04; A61K 31/715; C09F 5/10
[52] U.S. Cl. ................... 552/545; 536/102; 536/119; 536/103; 426/592; 424/439; 435/55; 554/206
[58] Field of Search ............. 514/58, 26, 55, 53; 536/102, 120, 103, 128, 119; 426/572, 387; 210/635, 502.1; 260/420; 435/55

[56] References Cited

U.S. PATENT DOCUMENTS

| | | | |
|---|---|---|---|
| 3,491,132 | 1/1970 | Reiners et al. ............ | 260/420 |
| 4,263,328 | 4/1981 | Parada et al. ............ | 426/572 |
| 4,426,292 | 1/1984 | Wernick et al. .......... | 210/502.1 |
| 4,528,271 | 7/1985 | Pechany et al. .......... | 435/55 |
| 4,693,905 | 9/1987 | Japikse et al. ........... | 426/387 |
| 4,728,064 | 2/1988 | Pitha .......................... | 514/58 |
| 4,870,060 | 9/1989 | Müller ........................ | 514/58 |
| 4,880,573 | 11/1989 | Courregelongue et al. .... | 260/420 |
| 4,904,307 | 2/1990 | Ammeraal et al. ......... | 514/58 |

FOREIGN PATENT DOCUMENTS

3226232A1 2/1983 Fed. Rep. of Germany .
3818591A1 12/1989 Fed. Rep. of Germany .

OTHER PUBLICATIONS

Webster, "Ninth New Collegiate Dictionary"; pp. 366 and 367 pp. 451 and 831, (1990).
Die Starke, vol. 27, No. 11, 1975, pp. 368-376; J. Szejtli: "Inclusion complexes of unsaturated fatty acids with amylose and cyclodextrin".
Derwent File Supplier, WPIL, 1989, accession No. 88-180176 (26), Derwent Publications Ltd., London, Great Britain; & JP-A-63 118 399 (Shiseido).
Derwent File Supplier WPIL, 1989, accession No. 86-172183 (27), Derwent Publications Ltd., London, Great Britain; & JP-A-61 103 385 (Teijin K.K.).
Journal of Food Science, vol. 48, 1983, pp. 646-647; P. Shaw: "Debittering citrus juices with beta-cyclodextrin polymer".

*Primary Examiner*—Michael G. Wityshin
*Assistant Examiner*—Louise N. Leary
*Attorney, Agent, or Firm*—Larson and Taylor

[57] ABSTRACT

A process of refining mixtures obtained from treatments of fatty media with cyclodextrin and containing complexes of cyclodextrin with lipophilic compounds, characterized by the fact that the said mixtures are washed with at least one anhydrous polar solvent, whereby at least partial dissociation of the complexes of cyclodextrin/lipophilic compounds is brought about, and the lipophilic compounds which are not included are released from their connection with cyclodextrin.

5 Claims, No Drawings

PROCESS OF REFINING MIXTURES OBTAINED FROM TREATMENTS OF FATTY MEDIA WITH CYCLODEXTRIN AND CONTAINING COMPLEXES OF CYCLODEXTRIN WITH LIPOPHILIC COMPOUNDS

The invention has as its object a process of refining mixtures obtained from treatments of fatty media with cyclodextrin and containing complexes of cyclodextrine with lipophilic compounds.

The term "fatty media" is used to denote any substance containing fatty materials, namely:

on the one hand, biological substances whose origin is
- animal, such as fatty materials of the group comprising tallow, lard, concentrated butter, fish oils, wool grease, blood, cerebrospinal materials, egg, milk and their derivatives,
- vegetable, such as vegetable oils, rosins, deodorant condensates, media containing aromatic compounds such as essential oils or oleoresins, odoriferous substances,
- fossil, such as mineral oils, and on the other hand, synthetic substances such as artificial aromas.

Cyclodextrins are cyclic molecules of polyanhydroglucose having a truncated cone shaped tubular configuration containing a hydrophobic cavity. They are known respectively as alpha, beta or gamma cyclodextrin according to whether they are made up of 6, 7 or 8 anhydroglucose units.

For the sake of simplification, the general term "cyclodextrin" is used here to denote any of the alpha, beta or gamma cyclodextrins a mixture thereof or derivatives of cyclodextrin.

Cyclodextrin is prepared by the treatment of liquefied starch with an enzyme, the cyclodextrin glycosyltransferase.

Due to its particular toroidal structure, cyclodextrin has the property of selectively absorbing in its hydrophobic cavity various reactive groups and molecular species basically belonging to lipophilic substances. The affinity of these for cyclodextrin (association constant) depends on their nature and their chemical configuration as well as their size in relation to that of the cavity of the cyclodextrin, which in turn depends on the number of glucose residues.

This natural capacity for complex formation of cyclodextrin is beginning to be utilized commercially, in particular in sections of the food industry, the pharmaceutical and cosmetics industry and industry in general.

It has thus been proposed to use cyclodextrin in processes for the elimination and separation of undesirable compounds as well as processes for the recovery of compounds of high value from biological fatty media.

Among these processes may be mentioned the extraction of steroids, in particular cholesterol, from fatty materials or biological substances such as those described in French Patent Applications Nos.2,601,959 and 2, 626,145.

Processes for the selective extraction of compounds of aromas from essential oils or the elimination of breakdown compounds which deleteriously affect the aroma of the latter [L. Szente "Cyclodextrin Workshop", Gand (1989), part 2, pages 5–6] are also known.

In these processes, cyclodextrin is brought into contact, in the presence of water, with the biological medium containing the lipophilic compounds to be extracted, the cyclodextrin being incorporated in a sufficient quantity to form complexes with these compounds. Once formed, these complexes are present in the aqueous phase which is separated from the fatty phase.

On an industrial scale, these aqueous residues, which contain the compounds to be eliminated or purified, are produced in very large quantities. By way of example, reference may be made to the process of extraction of cholesterol from fatty materials described in French Patent Application No.2 601 959. This process leads to the formation of about 10% by weight of product of extraction based on the fatty material treated at the head of the process.

The invention proposes to treat and utilize these aqueous residual mixtures remaining from the processes of extraction with a view to recovering in a substantially pure form each of the important components thereof, in particular cyclodextrin, which may thus be recycled, either to be returned to the processes of extraction so as to reduce the cost of the latter or to other applications. It would also be of interest to be able to recover certain fatty substances present in the said mixtures, which substances may or may not be included in the internal cavity of cyclodextrin and among which may be mentioned recyclable lipid substances, steroids such as cholesterol, vitamins and compounds which constitute aromatic substances.

The fractionation, separation and recovery in a pure form of these various components of the said mixtures which are in the form of complex heterogeneous media are, however, rendered difficult by the extremely great affinity of certain lipophilic substances for cyclodextrin.

Up to the present day, the man of the art has had no need to solve such a problem since the use of cyclodextrin for the extraction of these various lipophilic substances is only in its first stages of development and is still only a laboratory technique.

The article "Inclusion complexes of unsaturated fatty acid with amylose and cyclodextrin" by Szejtli et al, "Die Stärke" No. 11 of 2.7.1975, pages 368 to 376, describes a process of extraction of fatty acids complexed with amulose and cyclodextrin, using mixtures of water/polar solvents such as ethanol.

According to the said processes, the complexes are washed several times with the solvent. When ethanol is used, which is found to be the most efficient solvent for breaking down the complex formation, washing must be repeated five times to extract the major part of the fatty acids. Moreover, this process leads to the formation of large quantities of dilute hydroalcoholic solutions which constitute effluents which are difficult to recycle and/or remove.

Such a method is too difficult and lengthy to be of any interest on an industrial scale. Moreover, it does not appear to be particularly effective.

It should be also noted that paradoxically the "cyclodextrin/fatty acid" complexes are prepared in a hydroalcoholic medium, the alcohol being ethanol which is the solvent subsequently used for breaking down the complex formation.

Methods of dissociating complexes of cyclodextrin/lipophilic compounds are also known, for example that employed in the processes of microbiological conversion of steroids using $\beta$-cyclodextrin as additive for rendering them soluble in water, a medium particularly suitable for this type of reaction (see French Patent Application 2 513 656).

In these processes, β-cyclodextrin may be recovered from the aqueous medium of bioconversion by extraction of the steroids with an organic solvent such as diisopropylether followed by precipitation of the free cyclodextrin by means of a solvent such as trichloroethylene, toluene or cyclohexane which reduces its solubility by the formation of a complex. Cyclodextrin is then isolated in a solid form by filtration.

The technique of recovery carried out here is complex and does not meet the industrial demand for economic efficiency. Moreover, it does not enable a large variety of lipophilic compounds to be decomplexated and extracted. Lastly, this process of recovery is specifically adapted to the treatment of bioconversion of steroids and could not be used generally for other applications.

The above-mentioned document also teaches the use of diisopropylether, an apolar organic solvent, for extraction. This goes contrary to what is disclosed in the said article by Szejtli, namely the use of polar solvents for the extraction of fatty acids which are in the form of complexes with cyclodextrin.

It is a main object of this invention to overcome the disadvantages of the prior art.

It is to the merit of the Applicant Company to have found as a result of extensive researches that contrary to what is indicated in Patent Application FR-A-2 513 656, namely that diisopropylether is the most suitable solvent for steroids, it is possible to separate and purify certain components of a mixture obtained after the treatment of a biological medium with cyclodextrin by washing the said mixture with at least one anhydrous polar solvent.

The invention therefore has as its object a process for refining mixtures obtained from treatments of fatty media with cyclodextrin and containing complexes of cyclodextrin with lipophilic compounds, in particular of the steroid type, characterised by the fact that the said mixtures are washed with at least one anhydrous polar solvent, whereby at least partial dissociation of the complexes of cyclodextrin/lipophilic compounds is brought about and the lipophilic compounds which are not included are released from their linkage with cyclodextrin.

When these substances are freed, they are easily separated from cyclodextrin which may then be recovered in a solid form and reused.

The process according to the invention enables the major part of the cyclodextrin initially present in the mixture to be recovered in the free form. The said cyclodextrin may in particular be reused upstream in the treatment of the biological medium, thereby rendering the treatment economical. Moreover, this process may also be used to recover all the original lipophilic substances, including steroids if applicable, either in a fractionated form or not.

These fatty substances may be utilized as starting materials in the manufacture of food products, cosmetics, industrial products (oleochemicals) and others. These fatty materials may also be subjected to treatments of purification such as saponification for the purpose of recovering, for example, the unsaponifiable components, among which the steroids are very valuable compounds.

The anhydrous polar solvent is advantageously chosen from ethanol, methanol, isopropanol, n-propanol, n-butanol and acetone.

A mixture of at least two anhydrous polar solvents may be used, such as, for example, mixtures of ethanol/methanol, ethanol/acetone or methanol/acetone.

The starting mixture is preferably in a solid or semi-solid form. Care should therefore be taken to dehydrate the mixture at least partly if it is initially liquid.

The process according to the invention is carried out at room temperature and at atmospheric pressure, the polar solvent being added to the starting mixture in a sufficient quantity to achieve decomplexation, preferably more than about 70% by weight, based on the dry starting mixture.

The mixture is then vigorously stirred until an alcoholic phase containing all the lipophilic compounds which may or may not be included in the cyclodextrin is obtained The free cyclodextrin is obtained in a solid form due to its insolubility in the solvent used. It can therefore easily be collected by any suitable physical means of separation, in particular by filtration or by centrifuging. To optimize its conversion into the solid form, it may be advisable to operate at a temperature below room temperature.

The time of contact between the mixture and the solvent must obviously be sufficient for extraction of the included or non-included lipophilic compounds. It varies in particular according to the vigorousness of stirring and the quantity of solvent. The man of the art can easily determine these parameters, which are not basically part of the process according to the invention.

The operations of washing with solvent and separation may be repeated several times on the solid residue obtained. The number of repetitions is a function of the nature of the starting medium and of the degree of purity required. At least 90% of the lipophilic substances initially present in the mixture to be refined may already be obtained in a single cycle.

The process according to the invention appears to be extremely simple to carry out. It is efficient and highly economical.

According to one variation of the process according to the invention, the starting mixture is subjected to at least one preliminary treatment with at least one apolar solvent suitable for extracting those lipophilic compounds which are most weakly attached to cyclodextrin before the treatment with at least one polar solvent is carried out.

Such a preliminary treatment results in the formation of an apolar phase containing part of the lipophilic compounds initially present in the mixture and of a residual mixture which is to be treated with at least one anhydrous polar solvent.

The lipophilic compounds with an apolar tendency present in the mixture are thus separated selectively. This may be of particular interest if the fraction collected can be reused in the biological media which are treated with cyclodextrin.

If the cyclodextrin is used upstream in the extraction of sterols from a biological medium, the fraction collected at the end of the preliminary treatment is essentially composed of triglycerides.

If the cyclodextrin is used upstream in the extraction of aromas from essential oils, the fatty fraction collected at the end of the preliminary treatment is similar to the essential oil deprived of the aromatic components.

To minimise the loss of material, it is advantageous to return the cyclodextrin to the biological medium.

The apolar solvent is preferably chosen from among the alkanes, the petroleum hydrocarbon compounds, chlorinated derivatives and ether oxides. It is even more preferable to select them from the group comprising hexane, carbon tetrachloride, benzene, dioxane, petroleum ether, diisopropylether, trichloroethylene and toluene. It was found that hexane was a particularly suitable apolar solvent.

Mixtures of at least two apolar solvents may be used, for example hexane may be mixed with carbon tetrachloride, or with diisopropylether.

The technical means suitable for carrying out both the treatment with polar solvents and the preliminary treatment with apolar solvents may consist in particular of a stirrer vessel having the outlet connected to continuous separating means such as, for example, a centrifuge, or it may consist of a percolating column containing the starting mixture in a substantially anhydrous form, through which the solvents are passed.

The extraction by means of at least one polar solvent may be carried out as part of an extraction technique with supercritical carbon dioxide.

Similarly, the preliminary treatment with at least one apolar solvent may be replaced by an extraction technique using supercritical $CO_2$.

This technique has undergone considerable development for some years. It consists of making use of the solvent and transporting properties of supercritical $CO_2$ which has a viscosity close to that of a gas and a mass per unit volume close to that of a liquid.

Supercritical $CO_2$ may be used in particular for the extraction of heat sensitive molecules and the recovery of apolar compounds. It is thus particularly suitable for the pretreatment provided in the process according to the invention.

When used in conjunction with a polar co-solvent, for example an alcoholic solvent selected from ethanol, methanol and isopropanol, it is found to be particularly suitable for the treatment according to the invention. The concentration in alcoholic solvent is advantageously from 1 to 10% by volume based on the $CO_2$, preferably from 3 to 5% by volume.

This technique with supercritical $CO_2$ known per se is basically composed of three phases: Conditioning of the solvent, extraction, separation.

For the conditioning of solvent, gaseous $CO_2$ under a pressure of the order of 50 bar is first purified on a bed of active charcoal to remove traces of hydrocarbons, water and alcoholic solvent. It is then liquefied by passage through a tubular condenser and then stored in a storage vessel in which an alcoholic solvent may be added by means of a dosing pump.

The $CO_2$ or mixture of $CO_2$/alcoholic solvent is then pumped at 450 bar and then heated to the extraction temperature of from 25° to 100° C. in a tubular heat exchanger.

For the extraction, the $CO_2$, optionally with the addition of solvent and conditioned to the supercritical state, passes through the charge contained in a cylindrical vessel inside an extractor, and is then withdrawn with the extract at a constant rate under a pressure of 60 to 450 bar.

To separate this extract from the supercritical $CO_2$, release of pressure from the fluid is carried out in separators, preferably two separators in series, at a pressure adjustable to 50-250 bar.

The enthalpy necessary for the vaporisation of $CO_2$ is provided by a circulation of hot water in a double jacketed apparatus. Quasi-complete separation between the extract and the gaseous $CO_2$ is obtained without any formation of mist. The gaseous $CO_2$ is recycled after elimination of any alcoholic solvent left in the decanter.

Within the application of this technique carried out according to the invention, the pressures for extraction are preferably from 200 to 400 bar for temperatures of 40° to 70° C. while the pressures for separation are from 50 to 60 bar for temperatures of the order of 50° to 70° C.

This technique using supercritical $CO_2$ as a preliminary treatment of the starting mixture containing the complexes enables the apolar lipophilic compounds which are most weakly attached to cyclodextrin to be extracted in the same manner as with an apolar solvent.

Combined with the treatment using alcoholic polar solvent, it enables all the lipophilic compounds initially present in the mixture to be extracted and the free purified cyclodextrin to be recovered.

The process according to the invention may be used not only for treating mixtures obtained from the extraction of steroids from biological media by means of cyclodextrin but also for treating mixtures obtained from the extraction of vitamins, fatty acids, aromatic substances and others.

The invention will be better understood with the aid of the non-limiting Examples which follow and which refer to advantageous embodiments.

EXAMPLE 1

1. Treatment of Butter for the Extraction of Cholesterol 100 kg of concentrated butter are treated with 5 kg of $\beta$-cyclodextrin (marketed by the Applicant company under the registered Trade Mark KLEPTOSE) in solution in 100 kg of tepid water.

After the components have been mixed at 40° C. and stirred at this temperature for 5 hours in a non-oxidizing atmosphere, a fatty phase depleted of cholesterol separates from an aqueous phase. The latter slowly clarifies to provide a decantate having a dry substance content of about 65% and composed of 80% of $\beta$-cyclodextrin and about 20% of fats.

About half the total fat contained in the decantate is adsorbed on the $\beta$-cyclodextrin.

The cholesterol amounts to 25% by weight of the 20% of total fat.

2. Refinement of Decantate

The decantate obtained as described above is dehydrated by lyophilisation. 2.53 g of this dehydrated decantate and 300 cm$^3$ of methanol are introduced into a flask equipped with stirrer.

A first washing with methanol is carried out with stirring for at least 5 minutes.

Filtration is then carried out on a filter paper to produce a first filtrate and a residue The latter is introduced into the flask for a second washing with 300 cm$^3$ of methanol. This is again filtered and another residue is recovered and the second filtrate, which is mixed with the first.

This mixture is placed in a current of nitrogen to evaporate the solvent. 0.5 g of fat corresponding to 98% of the fat initially present in the decantate is thus collected. Thin layer chromatography of this fatty material collected shows the presence of triglycerides, free fatty acids and cholesterol, that is to say all the lipophilic compounds initially present in the decantate. Gas phase chromatography shows that the quantity of cholesterol recovered is 0.126 g. The yield of recovery achieved by this process is thus in the region of 100%.

The residue is dried in an oven under a vacuum maintained at 30° C. The powder obtained is analysed by infra-red spectroscopy and by liquid chromatography which verifies that the substance consists substantially of cyclodextrin.

A similar result is obtained when methanol is replaced by ethanol.

EXAMPLE 2

2.67 g of the dehydrated decantate from Example 1 are subjected to the same washings as those provided for the refining process described in Example 1 except that the 300 cm$^3$ of methanol employed for each washing are replaced by 100 cm$^3$ of hexane.

0.23 g of fatty substance are thus obtained, which corresponds substantially to the total quantity of fatty substance adsorbed on the cyclodextrin in the decantate. Analysis of this by thin layer chromatography shows that it consists substantially of triglycerides.

The level of cholesterol present in this lipid fraction recovered by washing with hexane was measured by gas phase chromatography and found to be less than 0.1%.

Refining according to the invention thus enables a first lipid fraction which is the least firmly bound to be extracted, and this may be utilized in various ways, in particular by recycling into the process of extraction upstream of the refining process.

The residue is dried as such. Infra-red spectroscopy confirms that it still contains complexes of cyclodextrin with lipophilic compounds, essentially sterols and fatty acids.

Replacement of hexane by carbon tetrachloride, toluene, trichloroethylene or isopropylether does not in any way alter the results obtained.

The dried residue obtained from the washings with hexane is subjected to two washings with methanol under the same conditions as those employed in Example 1.

0.24 g of fatty substances are recovered from the filtrates, and infra-red spectroscopic analysis and analysis by thin layer chromatography reveals that these substances consist of cholesterol as main component and fatty acids.

The cholesterol level is measured by gas phase chromatography and is of the order of 50%.

This corresponds to a yield of recovery of cholesterol of the order of 95%.

The residue is dried in an oven under a vacuum maintained at 30° C. It is confirmed that 2.15 g of powder obtained substantially consists of $\beta$-cyclodextrin.

We claim:

1. The method of removing cyclodextrin from complexes of cyclodextrin with steroids, fatty acids vitamins or compounds of aromas, which comprises subjecting the said complexes to a treatment in substantially anhydrous conditions with more than about 70% by weight based on the dry weight of the complexes of anhydrous polar solvent selected from the group consisting of ethanol, methanol, isopropanol, n-propanol, n-butanol, acetone and their mixtures for a time sufficient to dissociate cyclodextrin from said complexes and recovering said cyclodextrin.

2. The method of claim 1, wherein the complexes are in a solid or semi-solid form.

3. The method of claim 1, wherein the complexes are subjected to a preliminary treatment with one apolar solvent selected from the group consisting of hydrocarbon compounds, chlorinated derivatives and ether oxides before the treatment with the anhydrous polar solvent is carried out.

4. The method of claim 3, wherein the apolar solvent is selected from the group consisting of hexane, carbon tetrachloride, benzene, dioxane, petroleum ether, diisopropylether, trichloroethylene, toluene and their mixtures.

5. The method of claim 1, wherein the complexes are subjected to a preliminary treatment with supercritical carbon dioxide before the treatment with the anhydrous polar solvent is carried out.

* * * * *